United States Patent [19]

Turner et al.

[11] Patent Number: 5,580,075
[45] Date of Patent: Dec. 3, 1996

[54] BICYCLE FORK SUSPENSION WITH EXCHANGEABLE SPRING UNIT

[75] Inventors: Paul H. Turner, Boulder, Colo.; Mike McAndrews, Santa Cruz, Calif.

[73] Assignee: Rockshox, Inc., San Jose, Calif.

[21] Appl. No.: 341,134

[22] Filed: Nov. 16, 1994

Related U.S. Application Data

[63] Continuation-in-part of Ser. No. 254,755, Jun. 6, 1994, Pat. No. 5,456,480.

[51] Int. Cl.⁶ .................................................. B62K 25/08
[52] U.S. Cl. ........................ 280/276; 267/294; 267/141.1
[58] Field of Search ................................ 280/281.1, 276, 280/277, 279, 275; 267/294, 141.1

[56] References Cited

U.S. PATENT DOCUMENTS

| | | | |
|---|---|---|---|
| 979,483 | 12/1910 | Harley | 280/283 |
| 4,971,344 | 11/1990 | Turner | 280/276 |
| 5,186,481 | 2/1993 | Turner | 280/276 |
| 5,193,833 | 3/1993 | Reisinger . | |
| 5,195,766 | 5/1993 | Dohrmann et al. | 280/276 |
| 5,269,549 | 12/1993 | Wilson et al. | 280/276 |
| 5,284,352 | 2/1994 | Chen | 280/276 |
| 5,310,203 | 5/1994 | Chen | 280/276 |

FOREIGN PATENT DOCUMENTS 420610  4/1991  European Pat. Off. ............. 280/276

*Primary Examiner*—Brian L. Johnson
*Assistant Examiner*—F. Zeender
*Attorney, Agent, or Firm*—Sixbey, Friedman, Leedom & Ferguson, P.C.; David S. Safran

[57] ABSTRACT

A front fork for bicycles which has a shock absorbing system having both a spring type shock absorbing unit and a hydraulic shock damping unit with variable and adjustable damping characteristics that will allow a wide range of adjustments for adapting the suspension to widely differing circumstances of rider weight and riding experience and has a spring type shock absorbing system which can be interchangeably be used with both stacked elastomeric pad and coil spring type spring shock absorbing units. Stacked elastomeric pad arrangements are provided which allow the pad stack to be exchanged as a unit with another pad stack or with a coil spring and an adjustment mechanism allows the performance characteristics of a particular pad stack to be changed. Alternatively, a leaf spring arrangement can be provided formed of pairs of oppositely facing convex-concave carbon fiber composite leaf springs can be employed to produce a unit that is especially light in weight. Furthermore, the spring unit, whether coil, pad, or leaf type, is able to co-act with the upper end of a piston rod of a hydraulic damping unit.

27 Claims, 7 Drawing Sheets

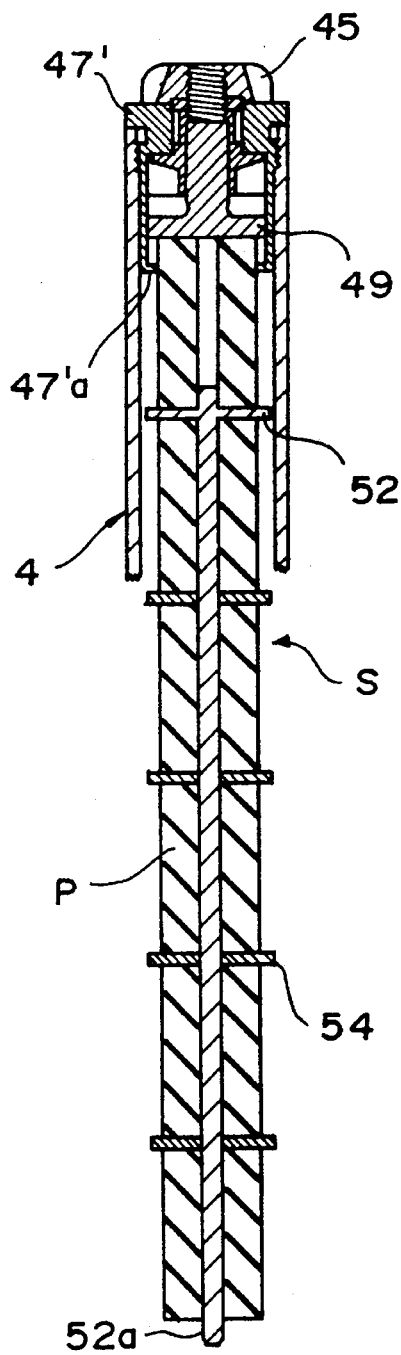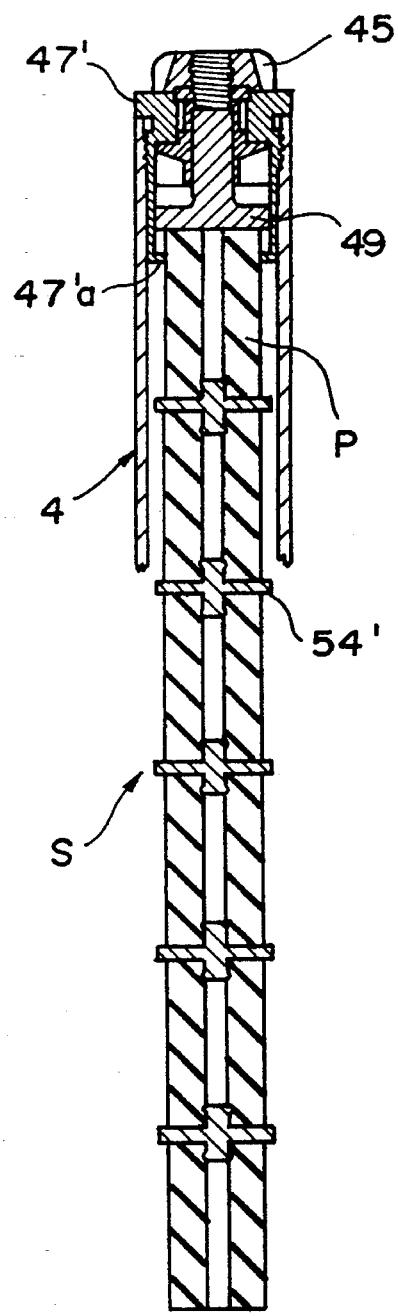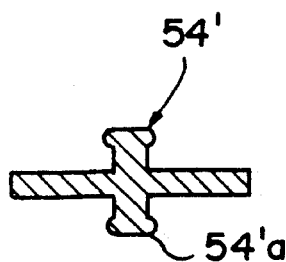
FIG. 4  FIG. 5
FIG. 6

BICYCLE FORK SUSPENSION WITH EXCHANGEABLE SPRING UNIT

CROSS-REFERENCE TO RELATED APPLICATION

The present application is a continuation-in-part of our U.S. Pat. application Ser. No. 08/254,755, filed Jun. 6, 1994, now U.S. Pat. No. 5,456,480.

BACKGROUND OF THE INVENTION

1. Field of the Invention

The present invention relates to a shock absorbing system for the front fork of bicycles. More specifically, the present invention relates to such a shock absorbing system having an exchangeable spring unit formed of elastomeric spring pads.

2. Description of Related Art

Front fork suspensions have been known for motorcycles for a long time and with the invention of Turner U.S. Pat. No. 4,971,344, became practical for use on bicycles, and have since found widespread use, particularly on mountain bicycles. In the suspension of the Turner patent, air pressure is used to adjust the hydraulic fork to compensate for rider weight variations or to produce a firmer or softer ride. However, because the extension damping performance of the suspension is directly related to the amount of air pressure in the system, adjusting of the air pressure to compensate for a rider's weight could adversely affect the extension damping characteristics of the suspension, and no other means existed to vary the performance characteristics of the suspension, nor was the suspension designed to produce differing performance characteristics under different loading conditions apart from an ability to "lockout" low level forces of the type produced by pedaling while allowing the fork to react to high impact forces.

In Turner U.S. Pat. No. 5,186,481, the fork suspension of the above-mentioned Turner patent was improved to enable varying of the preload on a coil-type compression spring, that acts to hold a compression valve plate of a metering valve located between upper and lower hydraulic chambers in a closed position until a predetermined force level is reached at which time it pops open to allow flow through the valve. In particular, by turning of an adjustment rod so as to screw it more or less into the metering valve, the coil-type compression spring is caused to contract or expand, thereby changing the force required to open the compression metering valve, and allowing a wide range of adjustments for adapting the suspension to widely differing circumstances of rider weight and riding experience. However, this adjustability does not affect the suspension beyond setting the threshold level at which compression of the fork will commence.

Other shock absorbing bicycle forks have since been developed which allow for personalized adjustment of the performance characteristics of the fork. For example, Wilson et al. U.S. Pat. No. 5,269,549, discloses a suspension for the front wheel of bicycles in which a spring action is used for shock absorbing purposes and is obtained by a rod-mounted arrangement of stacked elastomeric pads which are disposed between the ends of the fork strut tubes to absorb shocks by deformation thereof. By using different combinations of pads of different durometers, resilience characteristics and/ or lengths, the shock absorbing characteristics can be changed in accordance with the rider's weight and the conditions under which the bicycle will be ridden. However, such an arrangement simply is incapable of achieving the same kind of ride as a hydraulic suspension, in that springs shock absorbing characteristics are a function of the distance they are compressed while a hydraulic suspension has a damping characteristic that is a function of the speed at which the shock absorber is compressed, and the mounting rod arrangement of this patent is not designed so as to be able to work in conjunction with a hydraulic damping unit. Additionally, an effective distribution of the compressive loading across the pads cannot be assured with the rod-mounted pad arrangement of this patent and no means exists to adjust the compression spring preload, and thus, the initial compression response characteristic of the fork for any given combination of pads.

Chen U.S. Pat. No. 5,284,352 discloses a compression-adjustable bicycle shock absorbing front fork which, like that of Wilson et al., utilizes a rod-mounted arrangement of interchangeable stacked elastomeric pads, to which a compression coil spring is added. In addition to the adjustability afforded by the ability to change elastomeric pads, the initial compression characteristics and the travel length which the strut can be compressed can be adjusted by rotating of a mounting member which acts to reduce or expand the initial height of the stacked pads and spring. Furthermore, washers are disposed between the rubber pads to distribute the external loading to the pads when the forks struts are compressed. While an improvement over the Wilson et al. suspension in that adjustments can be made without replacing one or more elastomeric pads with others, it still lacks the damping characteristics of a hydraulic suspension, and like the Wilson et al. mounting rod arrangement, the mounting rod arrangement of this patent is not designed so as to be able to work in conjunction with a hydraulic damping unit. Additionally, the mounting rod arrangement of elastomeric pads cannot be changed as a unit.

Furthermore, it is recognized that coil springs and elastomeric pads have compression response characteristics that are different. Since a coil spring has a constant spring rate and an elastomeric pad has a spring rate which increases as it is compressed, a coil spring will provide a linear increase in force per unit of compression, while an elastomeric pad will produce an exponential increase in force per unit of compression. Thus, for some riders (weight or skill level) and/or riding conditions, a coil spring might produce a more suitable ride while in others stacked elastomeric pads might prove more desirable. However, neither the Wilson et al. nor the Chen suspensions are designed to enable use of a coil spring instead of the rod-mounted pad arrangement, and while the Chen suspension is provided with a coil spring in addition to the rod-mounted pad arrangement, its function is primarily to allow the permissible degree of fork travel to be adjusted.

Thus, there is still a need for a shock absorbing system for a bicycle fork which can combine the advantages of both a spring type shock absorber and a hydraulic shock damping unit, that will enable the spring component to be exchanged and adjusted in a way that allows the performance curve type to be changed and a wide range of spring rate adjustments to be obtained for adapting the suspension to widely differing circumstances of terrain, rider weight and riding experience, yet, at the same time being practical and economic for use on bicycles by the average rider thereof.

SUMMARY OF THE INVENTION

It is a primary object of the present invention to provide a front fork for bicycles which has a shock absorbing system having both a spring type shock absorbing unit and a hydraulic shock damping unit with variable and adjustable damping characteristics that will allow a wide range of adjustments for adapting the suspension to widely differing circumstances of rider weight and riding experience. It is a more specific object of the present invention to provide a bicycle suspension which utilizes stacked elastomeric pads as shock absorbing springs which not only can be used in the manner of the above-mentioned prior art, but is particularly adapted for use in conjunction with a hydraulic damping unit.

Another object of the present invention is to provide a front fork for bicycles which has a spring type shock absorbing system which can be interchangeably used with both stacked elastomeric pad and coil spring type spring shock absorbing units.

A still further object of the present invention is to provide a front fork for bicycles which has a stacked elastomeric pad type spring shock absorbing unit in which the pads can be quickly and simply changed, and in which adjustments that have been made to the initial preload need not be lost when the pad set is replaced.

These and other features of the present invention are obtained in accordance with preferred embodiments in which washers are provided between each pair of pads for distribution of the compressive forces to the elastomeric pads, and where the elastomeric pads are held together in a manner which allows the pad stack to be exchanged as a unit with another pad stack or with a coil spring. Furthermore, the spring unit, whether coil or pad type, is able to co-act with the upper end of a piston rod of a hydraulic damping unit.

In accordance with one embodiment, a separator plate with a mounting rod extension mounts the elastomeric pads and the washer. In a second embodiment, a separator plate having oppositely directed, axially mounting nubs is used to connect each adjacent pair of elastomeric pads together. In either case, the spring unit mounts into an adjustable mounting unit, and the lower end of the pad stack or coil spring rests upon a flange at the top end of the piston rod so that the pad stack and hydraulic damping unit can act in conjunction with each other. Furthermore, in the case of the embodiment in which the stacked pads are rod-mounted, the piston rod is provided with an axial passage within which the mounting rod telescopes.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 4 is a cross-sectional view of a portion of an upper strut tube and a first embodiment of a stacked elastomer spring unit;

FIG. 5 is a cross-sectional view of a portion of an upper strut tube and a second embodiment of a stacked elastomer spring unit;

FIG. 6 is a side view of a separator plate of the stacked elastomer spring unit of the FIG. 5 embodiment;

DETAILED DESCRIPTION OF THE PREFERRED EMBODIMENTS

Figure 1:
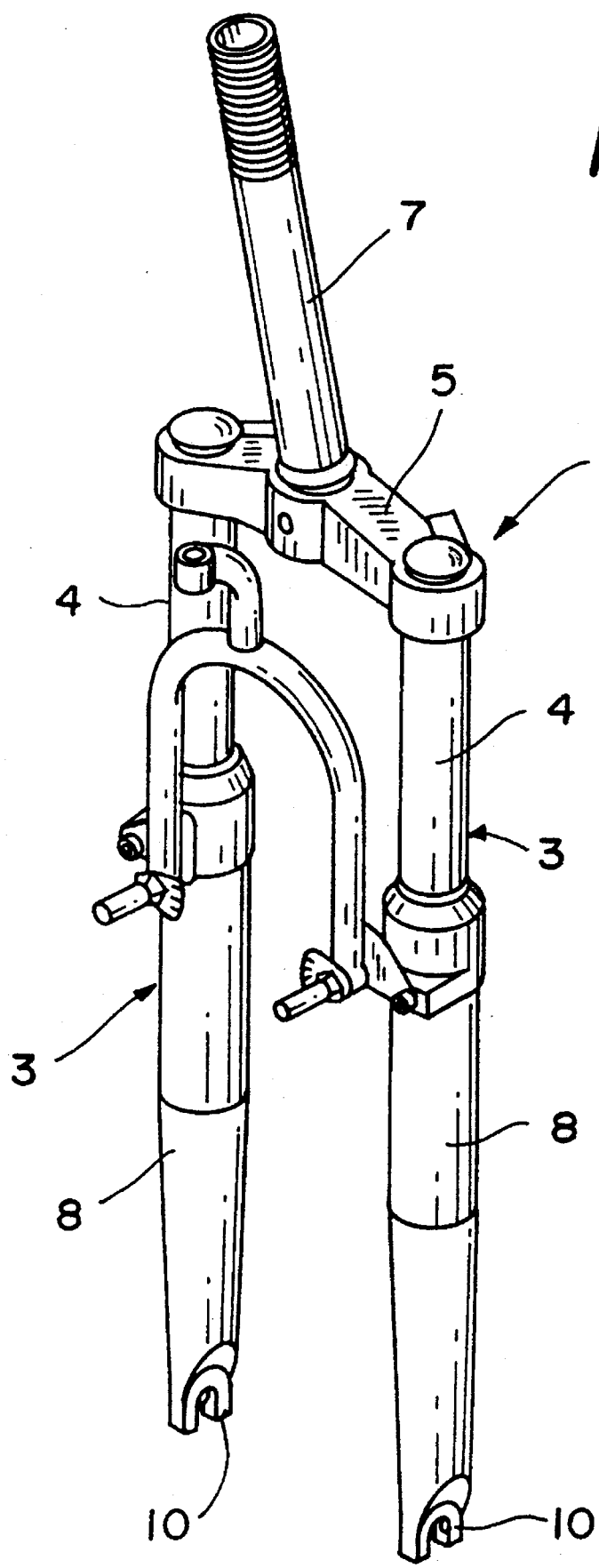
FIG. 1 is a perspective view of a front fork for a bicycle incorporating a shock absorbing system of the present invention.

FIG. 1 shows a shock absorbing front fork 1 for a bicycle of the type having a pair of telescoping struts 3, upper tubes 4 of which are interconnected by an upper crown 5 to a steerer tube 7 at upper end portions thereof. The lower tubes 8 of struts 3 telescopingly receive the upper tubes 4 in the upper end thereof, and have mounting brackets 10 to which an axle of a front wheel (not shown) is attached at the bottom end the struts.

Figure 2:
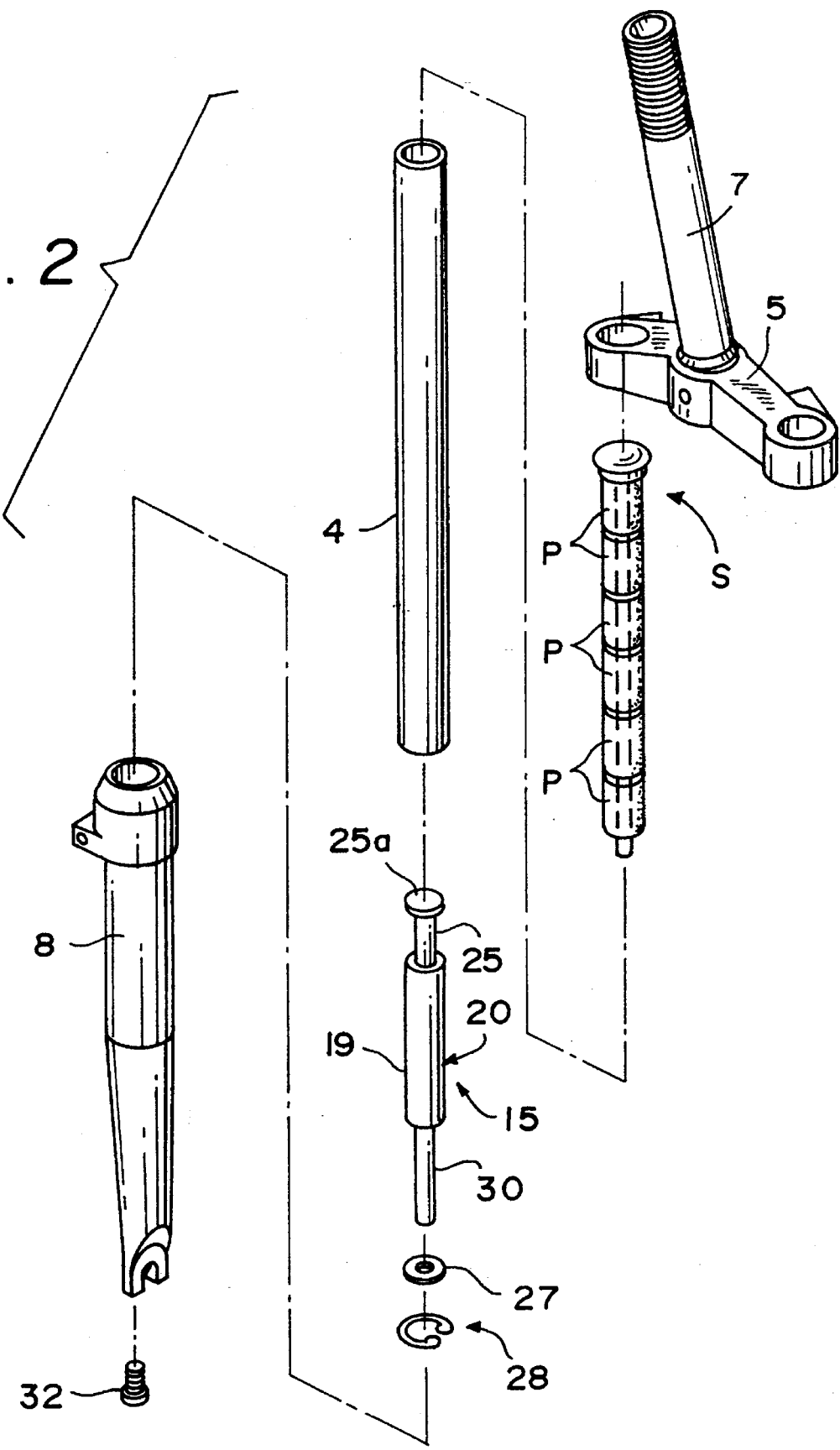
FIG. 2 is a view of an exploded view of one strut of the FIG. 1 fork and a crown with a steerer tube.

A hydraulically damped shock absorbing arrangement 15 is disposed within at least one of the telescoping struts 3, it having been found to be sufficient (and acceptable from a fork flexing standpoint) to provide compression damping in only one strut 3 of fork 1, it also being possible to provide the same or a different type of hydraulic damping, or no hydraulic damping at all, in the other strut 3. As can be seen from FIGS. 2 & 3, the hydraulically damped shock absorbing arrangement 15 is formed, in this case, by the body 19 of a replaceable cartridge unit 20 which includes a piston 16 which divides a hydraulic fluid containing cylinder into an upper chamber 21 and lower chamber 22. A piston rod 25 is connected to the piston 16 and extends through the upper chamber 21, passing through the top end wall 19a of the cartridge body 19, with a seal 26 being provided thereat to prevent leakage. The cartridge body 19 is retained in the open lower end portion of the upper tube 4 by any suitable means, such as by being provided with an enlarged end portion 19b which is received in an annular recess in the peripheral wall of the upper tube 4 and is held therein by an optional washer 27 (FIG. 2) and a C-shaped, spring retainer clip 28 which engages in an annular groove at the lower end of the annular recess in the peripheral wall of the upper tube 4. A rod 30 extends from the opposite side of the piston 16 from piston rod 25, passes through a seal 31 and the lower end wall of the cartridge body 19. The lower end of this rod 30 is fixed, such as by a screw 32, to the bottom end of the lower tube 8. Thus, relative movement between the upper and lower tubes 4, 8, produces relative movement between the piston 16 and the cartridge body 19 with rod 30 moving into the cartridge body 19 and the piston rod 25 moving out of the cartridge body 19 during compression and the reverse occurring during extension, FIG. 3 showing the relationship thereof in a fully extended state with piston 16 at the bottom of cartridge body 19 in engagement with an elastomeric extension stop 33.

Figure 7:
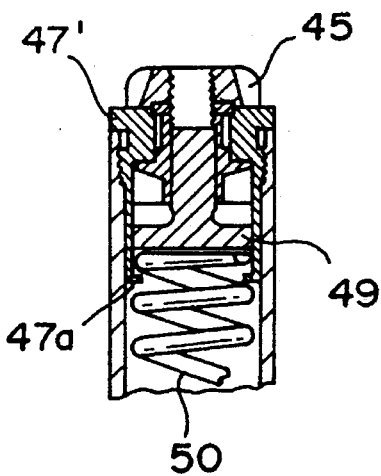
FIG. 7 is a cross-sectional view of a portion of an upper strut tube and a coil spring type spring unit.

For absorbing shocks, a spring unit S acts between a flange 25a, (FIGS. 2 & 3) is provided on the outer, upper end of the piston rod 25, and the upper tube 4 of each strut 3. The spring means can comprise one or more rubber or elastomeric bumpers, as represented in FIGS. 2–5, a coil spring, as represented in FIG. 7, or any other suitable compression spring arrangement. As the strut 3 is compressed, e.g., due to impacting of the front wheel on a rock or in a rut, the upper tube 4 moves into the lower tube 8 compressing the spring means S between its upper end and piston flange 25a and as the spring unit S is compressed, impact energy is absorbed. At the same time, the forces acting between the tubes 4, 8 cause piston 16 to act on the hydraulic fluid in the upper chamber 21 causing fluid to flow therefrom into lower chamber 22, for compression damping purposes, in a manner dependant on the characteristics of flow passage(s) between the chambers and/or a compression valve controlling such flow in any manner known in the art or as described below in connection with FIG. 10. By way of example, FIG. 3 shows the connected ends of rods 25 and 30 having an axial passage 36 therein which provides communication between the chambers 21, 22 via ports 38, 40, in a manner described in detail in applicants' co-pending U.S. patent application 08/254,755, which is more fully referenced below. The details of such a hydraulic damping unit, per se, form no part of this invention.

Figure 3:
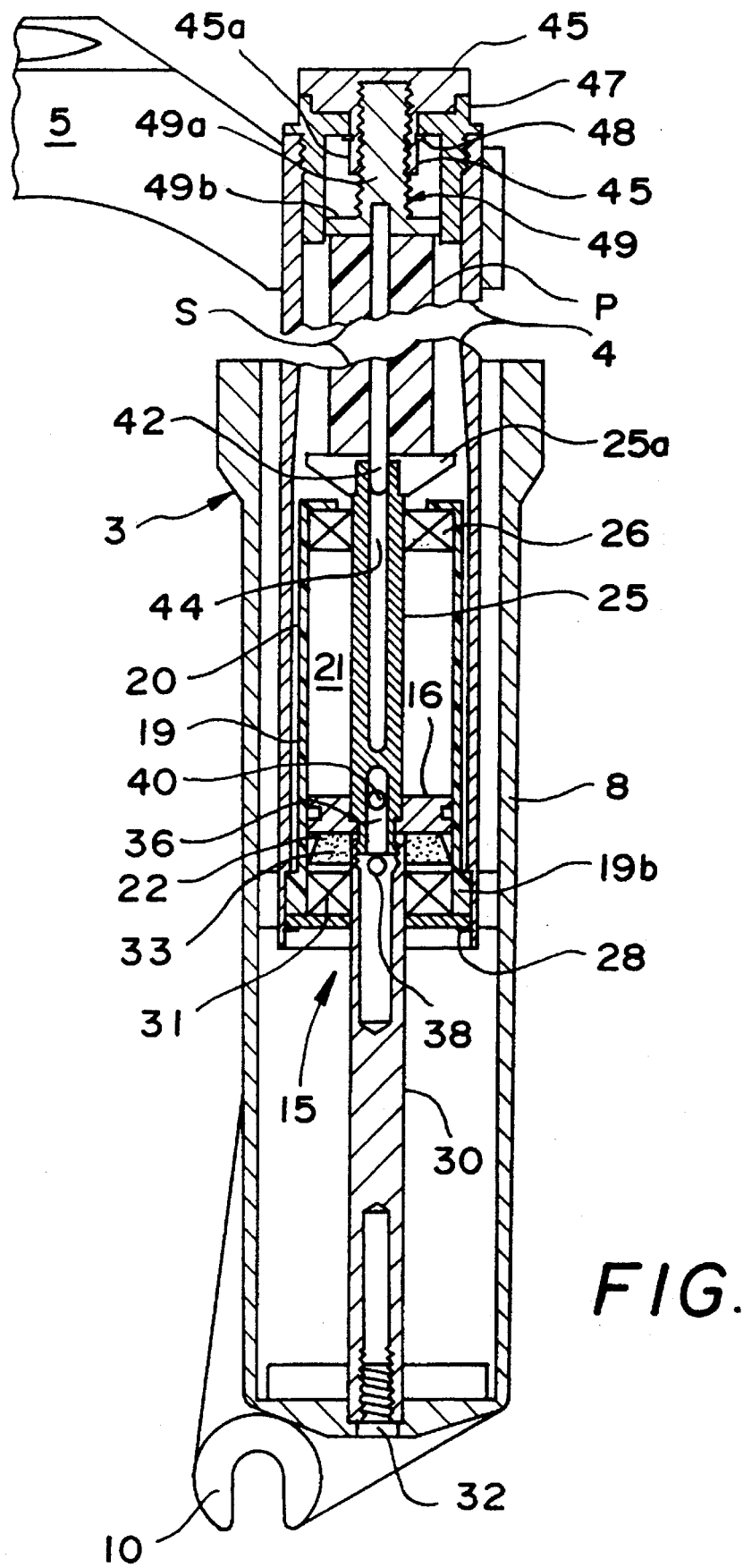
FIG. 3 is a vertical cross-sectional view of a portion of one strut of the FIG. 1 fork.

In the case where a rod-mounted arrangement of elastomeric pads P, such as those of the above-mentioned Wilson et al. and Chen patents is utilized as the spring unit S, as generically represented in FIG. 3, the free end of the mounting rod 42, which has been swaged or otherwise sufficiently enlarged to prevent the pads from falling off, is received in an axial passage 44 of the piston rod 25. When the pad arrangement is compressed as flange 25a moves into the upper tube 4 during compression of the strut 3, the mounting rod 42 telescopes into passage 44. To allow the initial preload on the pad arrangement to be adjusted, and thus, the initial load under which the fork will compress, an adjustment mechanism is provided at the top end of the upper tube 4. In particular, an adjustment knob 45 is seated on the top of an end cap 47 which is screwed into the top end of upper tube 4. Adjustment knob 45 has an internally threaded stem 45a which extends through an opening in end cap 47 and is axially held in place therein by a C-clip 48 in a manner permitting the adjustment knob 45 to be rotated. An externally threaded stem 49a of preloading member 49 is threaded into the stem 45a. Thus, by rotation of the adjustment knob 45, the preloading member 49 can be moved up and down, and since a flanged end face 49b of the preloading member 49 engages the top end of elastomeric pad P, the preloading applied to the stack of pads P can be increased or decreased in this manner.

By unscrewing of the end cap 47 from the upper tube 4, the pads P, mounted on rod 42, can be removed from the strut 3. Then, the elastomeric pads P can be individually pulled off and replaced as in noted prior art arrangements. However, with the more preferred arrangements now to be described, the sets of pads P forming the spring unit S can be removed and replaced as a unit, and can even be replaced by a coil spring 50 (FIG. 7).

Initially, it is noted that the end cap and adjuster structure is the same in FIGS. 4, 5 & 7, and differs, essentially, frown that described above relative to FIG. 3 in that the end cap 47' has a plurality of depending fingers 47'a with barb or hook-shaped ends for holding either the top most pad P (FIGS. 4 & 5) or the end turn of coil spring 50 (FIG. 7) sufficiently firmly to enable the spring unit to be pulled out of the upper tube 4 with removal of the end cap 47'. However, in this case, a mounting rod for the elastomeric pads P is not attached to the preloading member 49. Instead, in the FIG. 4 arrangement, an upper spacer plate 52 is provided between the top two pads P which has a mounting rod 52a formed as part thereof projecting from its bottom face, while a mounting knob (similar to the mounting knob 54'a shown in FIG. 6) is provided projecting from the top side of upper spacer plate 52. The second and subsequent pads P are mounted on the mounting rod 52a with a washer-type, pressure distributing spacer plate 54 disposed between the second and subsequent pairs of pads P, with clearance relative to the mounting rod 52a (to prevent frictional rubbing therebetween). Here again, the lower end of the mounting rod is swaged or otherwise enlarged to prevent the pad arrangement from falling off and the lower end thereof is received in the passage 44 of the piston rod 25.

The advantage to such an arrangement lies in the fact that the pads P no longer have to be taken off and put on one by one, and can be more simply removed and replaced as a unit instead. Furthermore, by leaving the topmost pad P in place, at least until the replacement unit is installed, the tendency of the adjustment knob to rotate is minimized, thereby enabling the adjustment setting to be maintained despite replacement of the pad unit.

FIG. 5 shows another preferred arrangement for a spring unit S formed of a stacked arrangement of pads P. In this case, each adjacent pair of pads P is joined by a pressure distributing spacer plate 54' that has a mounting knob 54'a projecting from top and bottom faces thereof. This arrangement possesses all of the advantages noted relative to the FIG. 4 pad arrangement plus the additional advantage of enabling individual pads to be replaced without remove lower pads from a mounting rod, first, and without affecting the preload adjustment setting. This ability can be particularly useful in the case where, upon inspection, it is found that only a single pad P has deteriorated to a point requiring replacement and it is to be replaced by a pad P having the same size and durometer as that being removed.

As mentioned in the Background portion above, coil springs and elastomeric pads have compression response characteristics that are different, a coil spring having a constant spring rate and an elastomeric pad having a spring rate which increases as it is compressed, so that a coil spring will provide a linear increase in force per unit of compression, while an elastomeric pad will produce an exponential increase in force per unit of compression. Thus, for some riders (due to weight or skill level) and/or riding conditions, a coil spring might produce a more suitable ride while in others stacked elastomeric pads might prove more desirable. From this standpoint, the end cap 47' having barbed fingers 47a is particularly advantageous since it enables the use of a coil spring 50 for the spring unit S. That is, the fingers can serve to hold the top turn or turns of coil spring 50 in a way that allows it to be inserted, removed, and preload adjusted in the manner as a spring unit S formed of stacked pads P and interchangeably therewith.

Figure 8:
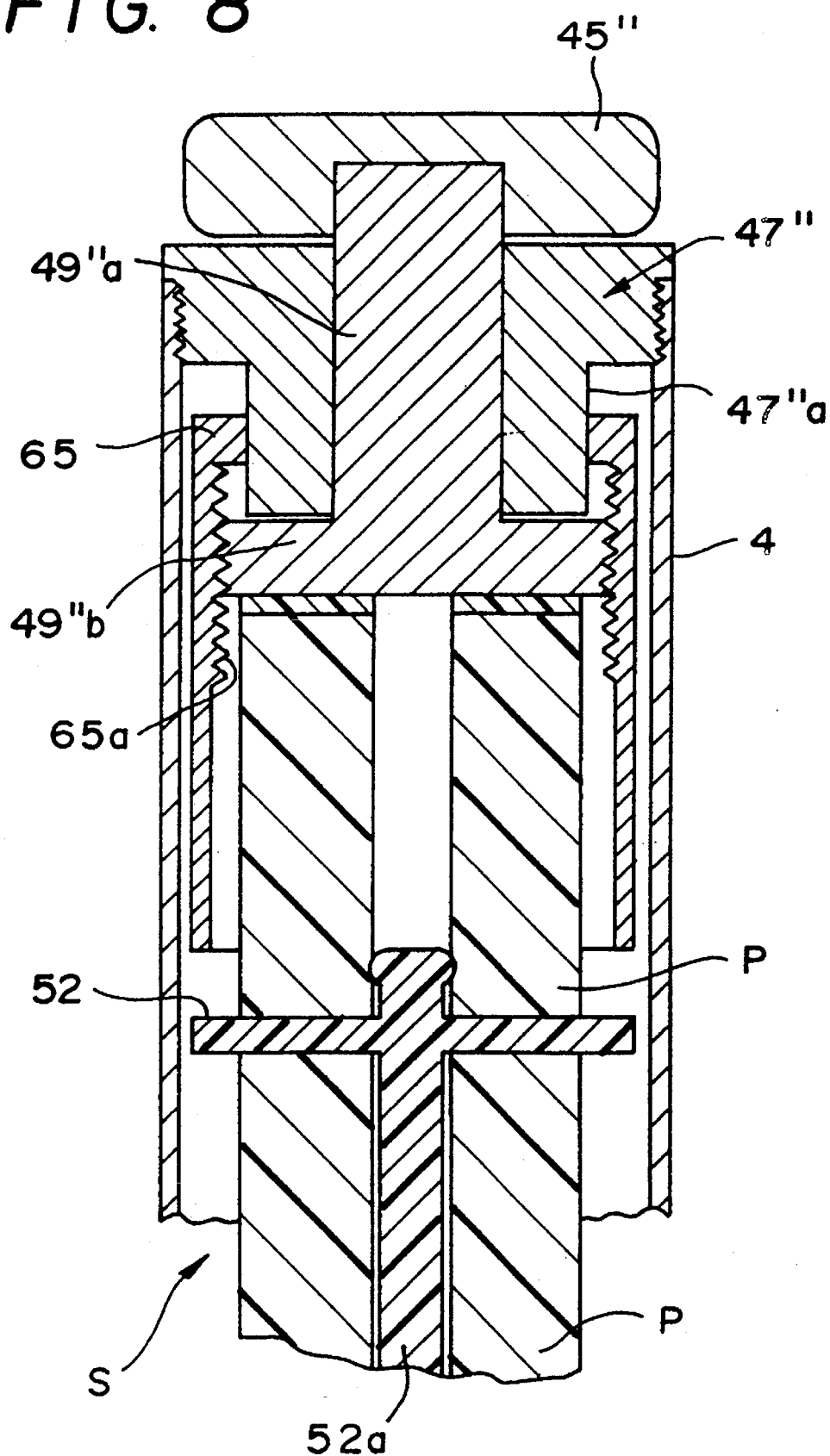
FIG. 8 is a cross-sectional view of a modified form of adjustment mechanism for the spring unit.

FIG. 8 shows an alternative to the end cap and adjuster structure describe so far which, while lacking the ability to enable the spring unit to be removed from the upper tube 4 of the telescoping strut 3 by removal of the end cap 47", it offers the advantage of allowing the rider to not only change the performance characteristics of the fork as a whole but to produce stiffer performance characteristics under riding conditions where the struts are subject to loads which produce high levels of compression relative to its characteristics under low load riding conditions. Furthermore, the inability to use the end cap as a removal tool is not a significant detriment since the topmost pad P can be used for that purpose. That is, after removal of the end cap 47", the user can easily manually compress the strut 3, thereby exposing the topmost pad P, which can then be grasp and used to pull out the all of the interconnected pads P.

In particular, the FIG. 8 end cap and adjuster structure utilizes an adjustment knob 45" which is connected to an adjustment member 49 which has an unthreaded stem 49"a that extends through the end cap 47" with clearance and has an externally threaded flanged end face 49"b at the lower end thereof. The adjuster member 49" is free to rotate within end cap 47" but cannot move an appreciable axial distance relative thereto as a result of the close positioning of the knob 45" and flanged end face 49"b at opposite sides of the end cap 47". Additionally, a stop sleeve 65 tides on the end cap stem 47"a so as to be able to slide axially relative thereto while being prevented from rotating by, for example, end cap stem 47"a being given a hex-shaped or other noncircular cross section which extends through a complimentarily shaped opening in stop sleeve 65. This stop sleeve 65 also has an internal threading 65a which is engaged with the external threading on flanged end face 49"b. As a result, rotation of knob 45" produces rotation of the end face 49"b and axial displacement of stop sleeve 65 toward or away from the washer-type, pressure distributing spacer plate 52 of the mounting rod 52a which is disposed between the first pairs of pads P.

The distance between the free lower end of the stop sleeve 65 and the upper surface of the topmost spacer plate 52 determines how far the strut 3 can be compressed before the topmost pad P ceases to be effective. That is, the spring unit S is effectively changed from one having, for example, five compressible elastomeric pads P to one having four such pads P when stop sleeve 65 engages the topmost spacer plate 52, thereby producing a step-wise increase in fork stiffness after an initial degree of compression.

This adjustment capability can not only be used to produce a stepwise change in performance characteristics during riding but can, instead, be used as a means for allowing the characteristics of the fork to be adapted to riders of different weights without having to change the set of pads P. That is, the fork could be used as one with a five pad set for lighter riders and as one with a stiffer four pad set for heavy riders simply by adjusting the position of the stop sleeve 65 relative to the topmost spacer plate 52.

Figure 9:
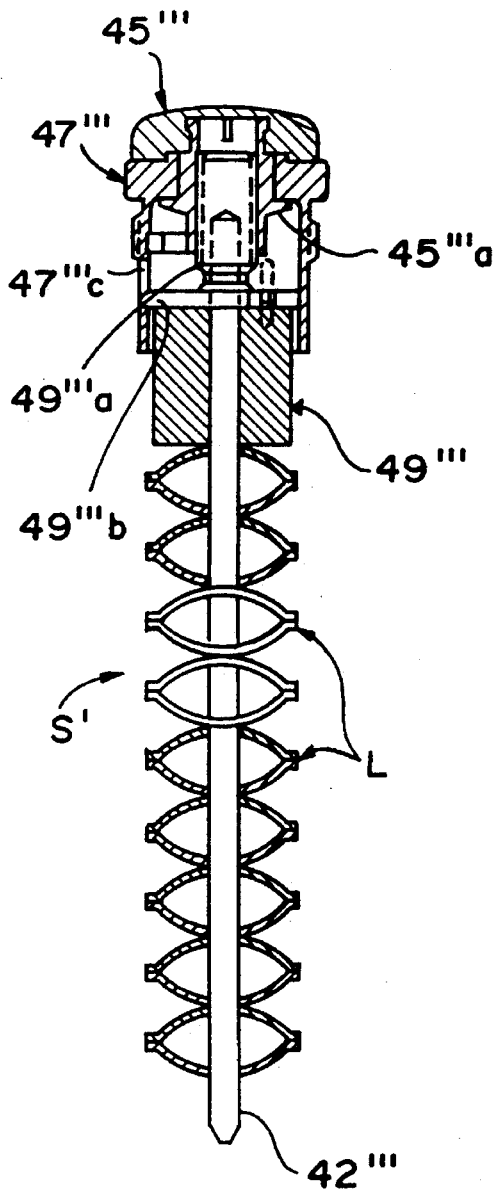
FIG. 9 is a partial cross-sectional view of an adjustable leaf spring type spring unit.
Figure 11:
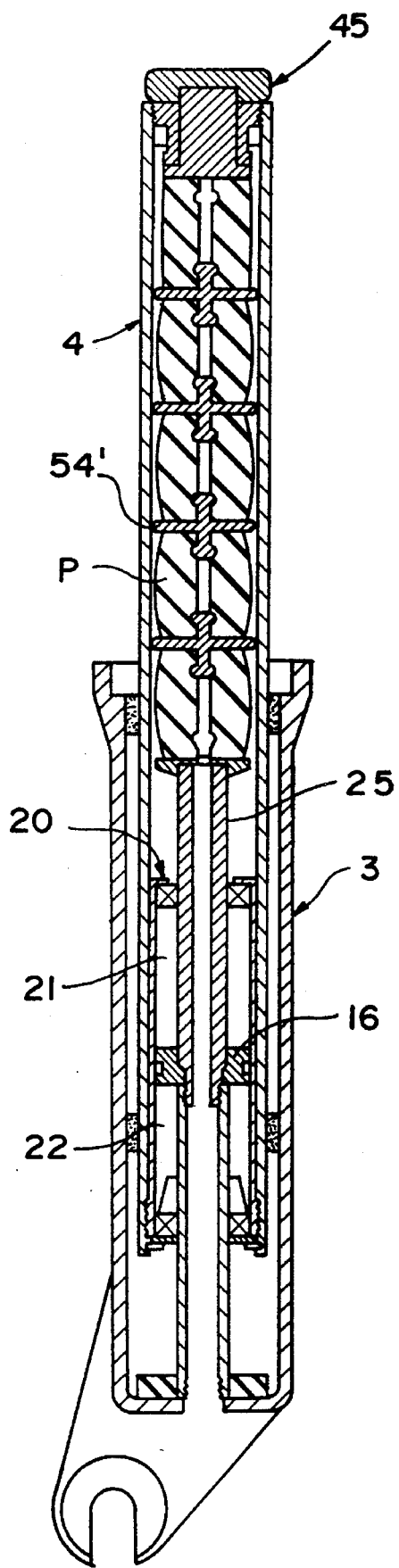
FIG. 11 is a cross section view of a strut having the FIG. 5 spring unit, with the strut in a compressed state.

FIG. 9 shows the use a leaf spring type spring unit S' which is especially advantageous from the standpoint of producing a spring unit which is light in weight. In particular, this embodiment uses a stacked arrangement of oppositely facing pairs of concave-convex, band-shaped (i.e., rectangular in plan view) leaf springs L, these leaf springs L being formed of a carbon fiber composite material in a manner resulting in the production of a spring force which varies substantially linearly as a function of compression of the springs L. The construction and properties of such fiber composite leaf springs L are known from a co-pending, U.S. patent application Ser. No. 08/314,610, and thus, need not be described herein.

The leaf springs L of the pairs of leaf springs are maintained in alignment with each other (i.e., so that the longitudinal direction of the fibers of the fiber composite material of all of the stacked springs L are parallel to each other) by a mounting aperture being provided extending centrally through each leaf spring L. The mounting aperture of each leaf spring L has a noncircular shape, such as a rectangular cross-sectional shape, and a mounting rod 42''' projects inwardly/downwardly from the preloading member 49''' through all of the leaf springs L of the stack. Mounting rod 42" has a cross-sectional shape which is complementary to the shape of the mounting apertures of the leaf springs L, thereby preventing the leaf springs L from rotating relative to the mounting rod 42''' and each other. Preferably, the mounting rod 42" is blade-shaped (i.e., has a thin and wide cross-sectional configuration), so that the spring aperture can be a narrow slot (e.g., at most, only 10–15% of the width of the leaf springs L) for minimizing disruption of the fibers of the carbon fiber composite material, by the longitudinal direction of such a narrow slot-shaped aperture being aligned parallel to the parallelly aligned fibers.

As with the previously described embodiments, an adjustment mechanism in the form of a rotatable adjustment knob 45''' can be provided on the end cap 47''' at the top end of the upper tube 4 for compressing and expanding the stacked springs L for setting a preload force thereon. In this case, rotation of the stem 49'''a of the preloading member 49''' is prevented by guide projections extending from the flanged end face 49'''b into guide slots 47'''c in the peripheral wall of the end cap 47'''. While the leaf springs L cannot be used with the spring mounting arrangements of the prior embodiments, except that of FIG. 3 if its mounting rod 42 is configured as indicated above, the spring unit S' as a whole, including its end cap 45''', etc., can be used interchangeably, in the same fork, with any of the other spring arrangements disclosed herein.

Figure 10:
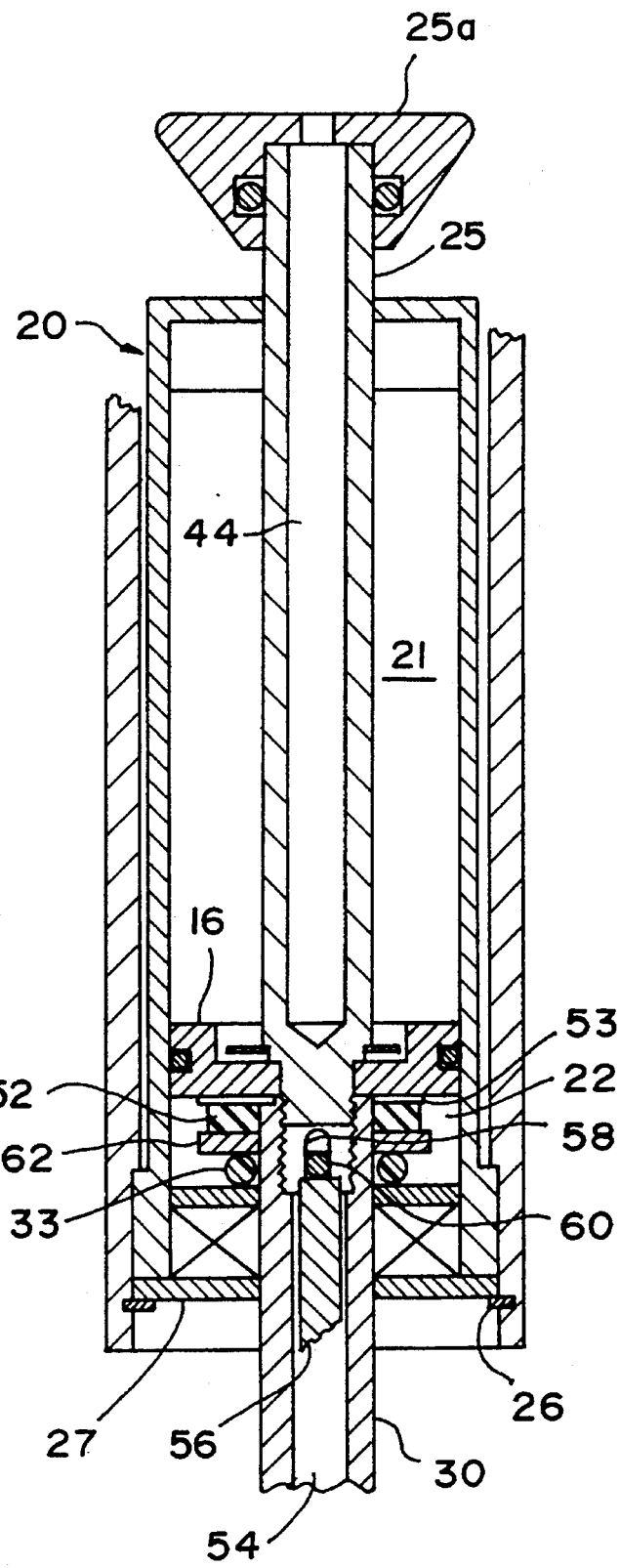
FIG. 10 is a cross-sectional view of a modified form for the hydraulic damping unit.

FIG. 10 shows an alternative form for the replaceable cartridge unit 20 which implements the compression damping adjustment feature of commonly assigned, co-pending U.S. patent application entitled Fork Suspension with Variable Hydraulic Damping, Ser. No. 08/254,755 filed Jun. 6, 1994, of the present applicants, now U.S. Pat. No. 5,456,480. Since the specifics of this arrangement form no part of the present invention, beyond the mere use thereof, and this compression damping feature is fully described in said copending application, only a brief discussion thereof is presented herein and reference may be had to said co-pending application to the extent that a further explanation be needed.

In the replaceable cartridge unit 20 of FIG. 10, piston 16 incorporates a compression valve that comprises at least one leaf spring disc 53 mounted on an opposite side of the piston 16 from the piston rod 25 and overlying a plurality of passages through piston 16. The total flow-through area of the passages is increased as the spring disc 53 is deflected away from the piston, commencing at a peripheral edge of the spring disc 53, due to pressure increases in the upper chamber due to compression of the struts but such deflection is controlled by an annular resilient pad 52 that is disposed overlying the spring disc 53. Lower rod 30 forms a compression damping adjuster shaft having a longitudinal passage 54 therein within and along which an axially adjustable abutment member 56 is displaceable. Intersecting with passage 54 is an elongated slot 58 through which a transversely extending pin 60 is disposed. The abutment member 56 acts on pin 60 to hold an abutment plate 62 against the resilient pad 52 and the resilient pad 52, in turn, against the spring disc 53 under a holding pressure which is adjustable. For example, by axial displacement of the abutment member 56 inwardly from its illustrated position in FIG. 8, pin 60 is displaced along slot 58, causing the abutment plate 62 to compress the pad 52, thereby increasing the force required to deflecting the valve disc 53 downwardly in response to increasing pressure in chamber 21 during compression of the strut 3.

The use of cartridge unit 20, instead of the conventional practice of using the tubes of the strut to define the hydraulic cylinder, achieves advantages from both a manufacturing standpoint and especially from a servicing standpoint. For example, from a manufacturing and assembly standpoint no special steps need be taken to separate the spring structure from the hydraulic damping structure, no strut need to be designed with regard to the need to fill the hydraulic cylinder of the damping unit. Furthermore, servicing is made very user friendly in that, should, with extended use, the fluid seals wear and leakage of hydraulic fluid from the cylinder result, the user can simply, cleanly and easily remove the entire cartridge unit 20 and replace it with a new one, instead of undergoing the troublesome and messy process of draining the fork, replacing the seals and refilling it, or having to pay a bicycle technician to do it for him or her. Furthermore, by providing its piston with a piston rod having a supporting flange 25a and an axial passage 44, the cartridge can used in tandem with a variety of different types of springs, irrespective of whether a mounting rod for the spring(s) must be accommodated, so that a single cartridge can be utilized with a variety of different types of fork suspensions as well as affording the noted advantages to a particular fork suspension.

While various embodiments in accordance with the present invention have been shown and described, it is understood that the invention is not limited thereto, and is susceptible to numerous changes and modifications as known to those skilled in the art. For example, while the illustrated embodiments all show the spring units S used in tandem with a hydraulic damping unit 15, those of ordinary skill will perceive that, while preferred, such an arrangement is not essential. Likewise, it will be apparent that the elastomeric pad arrangement of FIGS. 4 & 5 and the leaf spring arrangement of FIG. 9 are usable in fork suspensions of the type disclosed in the Wilson et al. and Chen patents, merely by using an end cap without a mounting rod joined thereto, similar to that shown in FIGS. 4 & 5 of the present application, on the one hand, or a mounting rod of noncircular cross section as in FIG. 9, on the other hand. Still further, while the end cap and adjuster structure shown with respect to FIG. 8 is shown used with the elastomeric pad arrangement of FIG. 4, it is also usable with the elastomeric pad arrangement of FIG. 5 without further modification. Therefore, this invention should not be viewed as being limited to the details shown and described herein. Instead, this invention includes all such changes and modifications as are encompassed by the scope of the appended claims.

We claim:

1. A shock absorbing fork for a two-wheeled vehicle having a pair of telescoping struts with upper tubes which are interconnected by an upper crown to a steerer tube at an upper end portion thereof and lower tubes which have means for mounting a wheel axle at a bottom end thereof, said upper and lower tubes being telescopically movable toward each other during compression of the telescoping struts and being telescopically movable away each other during expansion of said telescoping struts; wherein a hydraulically damped shock absorbing arrangement is provided which is a self-contained unit that is removably disposed within at least one of the telescoping struts, said shock absorbing arrangement having a replaceable hydraulic damping cartridge unit which comprises a means for damping telescopic movement of said upper and lower tubes, said cartridge unit having a cartridge body having walls defining a hydraulic cylinder with a hydraulic fluid contained therein, a piston disposed in said hydraulic cylinder, upper and lower hydraulic fluid chambers being defined in said cylinder by said piston in conjunction with said cartridge body, and a spring type shock absorbing means for absorbing wheel impact forces, said spring and cartridge body being enclosed at least partially within one of said upper and lower tubes with said spring type shock absorbing means being disposed directly between the hydraulic damping cartridge unit and an end wall of said one of said upper and lower tubes in a manner causing compression of said spring type shock absorbing means together with a relative movement of said piston within said cylinder by compression movement of said telescopic struts for damping compression said spring type shock absorbing means by said relative movement.

2. A shock absorbing fork according to claim 1, wherein said spring type shock absorbing means comprises a stacked arrangement of elastomeric pads.

3. A shock absorbing fork according to claim 2, wherein the stacked arrangement of elastomeric pads comprises a plurality of elastomeric pads arranged as a top pair, second pair and at least one subsequent pair of said elastomeric pads with a pressure distributing spacer plate disposed between each of said elastomeric pads, said spacer having top and bottom faces; wherein the one spacer plate provided between the top pair of said elastomeric pads has a mounting rod projecting from a bottom face thereof and a mounting knob projecting from a top side thereof; wherein the second and subsequent pairs of pads are mounted on the mounting rod, the other spacer plate disposed between the second and subsequent pairs of elastomeric pads being washer-shaped.

4. A shock absorbing fork according to claim 2, wherein the stacked arrangement of elastomeric pads comprises a plurality of elastomeric pads and pressure distributing spacer plates disposed in an alternating pad-plate-pad series in which each of said spacer plates is between two of said elastomeric pads; wherein each spacer plate has a mounting knob projecting from top and bottom sides thereof for interconnecting the spacer plate and the respective two elastomeric pads.

5. A shock absorbing fork according to claim 1, wherein said spring type shock absorbing means comprises a coil spring.

6. A shock absorbing fork according to claim 1, wherein said spring type shock absorbing means comprises a stacked arrangement of opposite facing pairs of concave-convex, band-shaped leaf springs, and means for maintaining the leaf springs of said pairs of leaf springs in alignment with each other.

7. A shock absorbing fork according to claim 6, wherein said leaf springs are formed of a carbon fiber composite material and have a spring force which varies substantially linearly as a function of compression of the springs.

8. A shock absorbing fork according to claim 1, wherein the upper tube has a top end and an adjustment mechanism provided at the top end of the upper tube, said adjustment mechanism having a displaceable surface for acting on the spring type shock absorbing means for setting a preload force thereon.

9. A shock absorbing fork according to claim 8, wherein said top end of the upper tube has an opening with an end cap; wherein said adjustment mechanism comprises an adjustment knob having an internally threaded stem which extends through the opening in the end cap of the upper tube and is axially held in place therein in a manner permitting the adjustment knob to be rotated, and a preloading member having an externally threaded stem threaded into the internally threaded stem of the adjustment knob, whereby rotation of the adjustment knob moves the preloading member up and down expanding and compressing said spring type shock absorbing means to set the preloading applied to the spring type shock absorbing means.

10. A shock absorbing fork according to claim 9, wherein said spring type shock absorbing means comprises a stacked arrangement of oppositely facing pairs of concave-convex, band-shaped leaf springs, and means for maintaining the leaf springs of said pairs of leaf springs in alignment with each other.

11. A shock absorbing fork according to claim 10, wherein said leaf springs are formed of a carbon fiber composite material and have a spring force which varies substantially linearly as a function of compression of the springs.

12. A shock absorbing fork according to claim 11, wherein said means for maintaining comprises a mounting aperture, having a noncircular shape and extending centrally through each leaf spring, and a mounting extension projecting from said preloading member; wherein said mounting extension has a cross-sectional shape which is complementary to the shape of said mounting aperture; and wherein said mounting extension extends through said stacked arrangement of oppositely facing pairs of convex-concave, band-shaped leaf springs.

13. A shock absorbing fork according to claim 10, wherein said means for maintaining comprises a mounting aperture, having a noncircular shape and extending centrally through each leaf spring, and an mounting extension projecting from said preloading member; wherein said mounting extension has a cross-sectional shape which is complementary to the shape of said mounting aperture; and wherein said mounting extension extends through said stacked arrangement of oppositely facing pairs of convex-concave, band-shaped leaf springs.

14. A shock absorbing fork according to claim 9, wherein said end cap has a plurality of depending fingers with one of barb and hook-shaped ends for holding a top portion of the spring type shock absorbing means and for enabling the spring type shock absorbing means to be pulled out of the upper tube therewith.

15. A shock absorbing fork according to claim 14, wherein said spring type shock absorbing means comprises a stacked arrangement of elastomeric pads a topmost pad being held by said plurality of depending fingers.

16. A shock absorbing fork according to claim 9, wherein the stacked arrangement of elastomeric pads comprises a plurality of elastomeric pads arranged as a top pair, second pair and at least one subsequent pair of said elastomeric pads with a pressure distributing spacer plate disposed between each of said elastomeric pads, said spacer having top and bottom faces; wherein the one spacer plate provided between the top pair of said elastomeric pads has a mounting rod projecting from a bottom face thereof and a mounting knob projecting from a top side thereof; wherein the second and subsequent pairs of pads are mounted on the mounting rod, the other spacer plate disposed between the second and subsequent pairs of elastomeric pads being washer-shaped.

17. A shock absorbing fork according to claim 9, wherein the stacked arrangement of elastomeric pads comprises a plurality of elastomeric pads and a plurality of pressure distributing spacer plates arranged as an alternating sequence in which each pressure distributing spacer plate is disposed between two of said elastomeric pads; wherein each spacer plate has a top side and a bottom side, a mounting knob with an enlarged head projecting from said top and bottom sides thereof for interconnecting the spacer plate and the respective two elastomeric pads.

18. A shock absorbing fork according to claim 8, wherein said spring type shock absorbing means comprises a coil spring.

19. A shock absorbing fork according to claim 2, wherein the upper tube has a top end; wherein the stacked arrangement of elastomeric pads comprises a plurality of elastomeric pads and a plurality of pressure distributing plates arranged in an alternating sequence in which each pressure distributing spacer plate is disposed between two of said elastomeric pads, said alternating sequence extending from an upper most one of said elastomeric pads and pressure distributing plates to a lower most one of said pressure distributing plates and a lowermost one of said elastomeric pads; wherein an adjustment mechanism is provided at the top end of the upper tube, said adjustment mechanism having a displaceable element for adjustably limiting compression of said upper most elastomeric pad by acting on the upper most pressure distributing spacer plate of the spring type shock absorbing means as a means for changing the performance characteristics of said spring type shock absorbing means once the telescoping struts have been compressed to an extent bringing said displaceable element into engagement with the upper most pressure distributing spacer plate.

20. A shock absorbing fork for a two-wheeled vehicle having a pair of telescoping struts with upper tubes having an upper end portion which is interconnected by an upper crown to a steerer tube and lower tubes which have a bottom end with a means for mounting a wheel axle; wherein a shock absorbing arrangement is disposed within each of the telescoping struts, said shock absorbing arrangement having a replaceable spring type shock absorbing means for absorbing wheel impact forces disposed between the upper end portion of said upper tube and the bottom end of the lower tube; wherein an adjustment mechanism is provided at the upper end portion of the upper tube, said adjustment mechanism having a displaceable surface for acting on the spring type shock absorbing means for setting a preload force thereon; wherein said adjustment mechanism comprises an adjustment knob which extends through an opening in an end cap of the upper tube in a manner permitting the adjustment knob to be rotated, and a preloading member acted on by said adjustment knob for moving the preloading member up and down, expanding and compressing said spring type shock absorbing means to set the preload force on the spring type shock absorbing means as a result of rotation of the adjustment knob in a respective rotational direction; and wherein said end cap has a plurality of depending fingers with barb or hook-shaped ends for holding only a top portion of the spring type shock absorbing means and for enabling the spring type shock absorbing means to be pulled out of the upper tube therewith.

21. A shock absorbing fork according to claim 20, wherein said spring type shock absorbing means comprises a stacked arrangement of elastomeric pads, a topmost pad being held by said depending fingers.

22. A shock absorbing fork according to claim 21, wherein the stacked arrangement of elastomeric pads comprises a plurality of elastomeric pads arranged in pairs including a top side pair, a second pair and at least one subsequent pair of said elastomeric pads with a pressure distributing spacer plate disposed between each of said pairs of said elastomeric pads; said spacer having top and bottom faces; wherein the spacer plate provided between the top pair of said elastomeric pads has a mounting rod projecting from the bottom face thereof and a amounting knob projecting from the top side thereof; wherein the second and subsequent pairs of pads are mounted on the mounting rod, the spacer plate disposed between the second and subsequent pairs of elastomeric pads being washer-shaped.

23. A shock absorbing fork according to claim 21, wherein the stacked arrangement of elastomeric pads comprises a plurality of elastomeric pads arranged as pairs of elastomeric pads with a pressure distributing spacer plate disposed between each of said pairs of said elastomeric pads; wherein each spacer plate has a top side and a bottom side, a mounting knob with an enlarged head projecting from said top and bottom sides thereof for interconnecting the washer and a respective one of said pairs of elastomeric pads.

24. A shock absorbing fork according to claim 20, wherein said spring type shock absorbing means comprises a coil spring.

25. A shock absorbing fork according to claim 21, wherein said spring type shock absorbing means comprises a coil spring in addition to said stacked arrangement of elastomeric pads, said depending fingers interchangeably holding a selected one of the stacked arrangement of elastomeric pads and the coil spring.

26. A shock absorbing fork according to claim 20, wherein a hydraulically damped shock absorbing arrangement is disposed within at least one of the telescoping struts between a lower end of said spring type shock absorbing means and the bottom end of the lower tube.

27. A shock absorbing fork for a two-wheeled vehicle having a pair of telescoping struts with upper tubes having an upper end portion with an end cap having an opening therein, an upper crown interconnecting a steerer tube at the upper end portion of the upper tubes, and lower tubes which have a bottom end with a means for mounting a wheel axle; wherein a shock absorbing arrangement is disposed within each of the telescoping struts, said shock absorbing arrangement having a replaceable spring type shock absorbing means for absorbing wheel impact forces disposed between the upper end portion of said upper tube and the bottom end of the lower tube; wherein the spring type shock absorbing means comprises at least two resiliently compressible spring elements in a stacked arrangement with a pressure distributing spacer plate disposed therebetween; wherein an adjustment mechanism is provided at the upper end portion of the upper tube, said adjustment mechanism having a displaceable element stop member for adjustably limiting compression of an upper one of said at least two resiliently compressible spring elements by limiting upward movement of the pressure distributing spacer plate disposed therebetween by contact therewith as a means for changing the performance characteristics of said spring type shock absorbing means once the telescoping struts have been compressed to an extent bringing said displaceable element into engagement with the pressure distributing spacer plate.

* * * * *